2 Sheets—Sheet 1.

J. M. HANNAHS.

ELEVATED RAILWAY.

No. 10,961. Reissued Oct. 2, 1888.

Witnesses:
Albert H. Adams.
Henry T. Jones.

Inventor:
James M. Hannahs

N. PETERS, Photo-Lithographer, Washington, D.C.

J. M. HANNAHS.

ELEVATED RAILWAY.

No. 10,961. Reissued Oct. 2, 1888.

Witnesses:
Albert H. Adams.
Harry T. Jones.

Inventor:
James M Hannahs

N. PETERS, Photo-Lithographer, Washington, D. C.

UNITED STATES PATENT OFFICE.

JAMES M. HANNAHS, OF CHICAGO, ILLINOIS.

ELEVATED RAILWAY.

SPECIFICATION forming part of Reissued Letters Patent No. 10,961, dated October 2, 1888.

Original No. 377,153, dated January 31, 1888. Application for reissue filed August 6, 1888. Serial No. 282,108.

*To all whom it may concern:*

Be it known that I, JAMES M. HANNAHS, of Chicago, in the county of Cook and State of Illinois, have invented a new and Improved Elevated Railway, of which the following is a full, clear, and exact description.

This invention relates to elevated railway road-beds, the object of the invention being to improve the construction illustrated, described, and claimed in Letters Patent No. 106,056, granted to me on the 2d day of August, 1870, and reissued November 24, 1874, No. 6,150.

Reference is to be had to the accompanying drawings, forming a part of this specification, in which similar figures of reference indicate corresponding parts in both the views.

Figure 1:
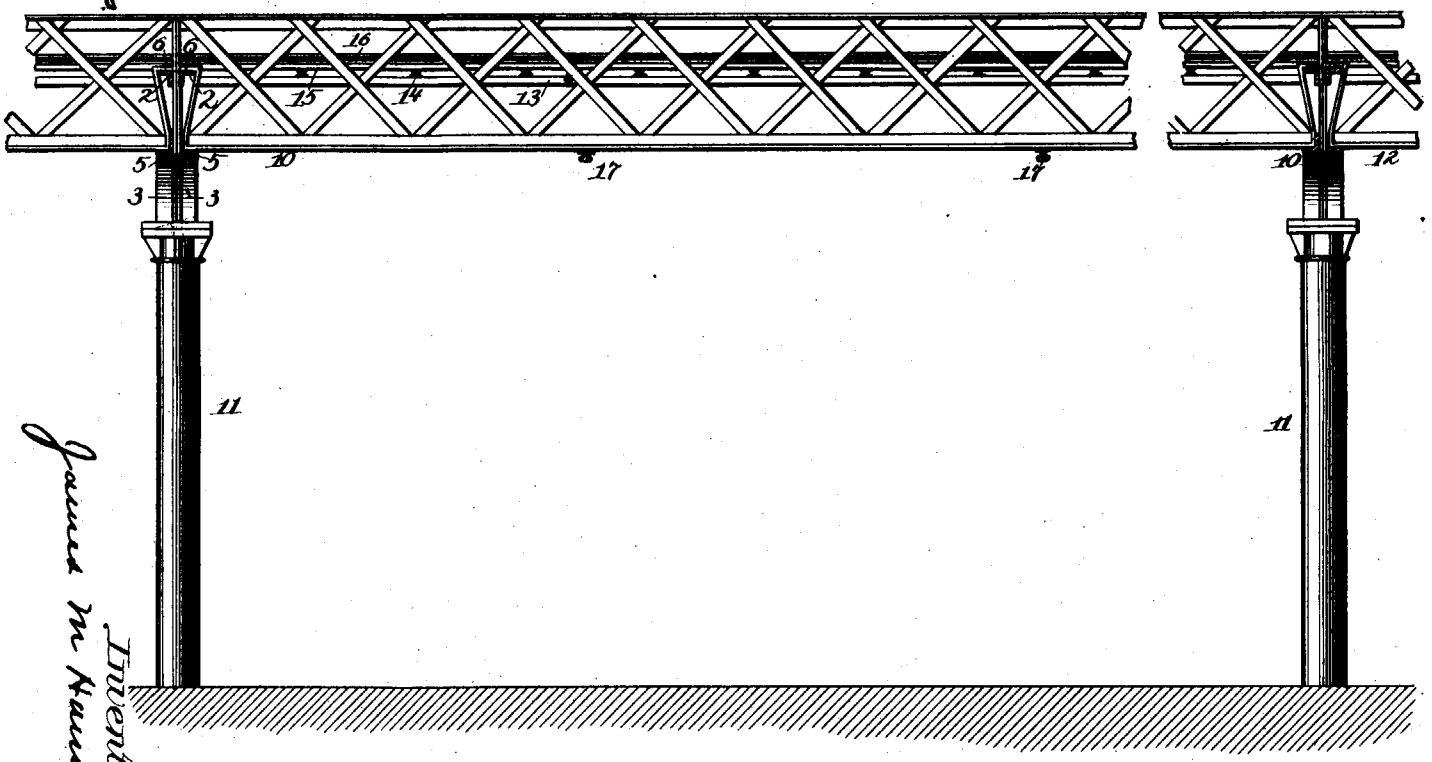
Figure 2:
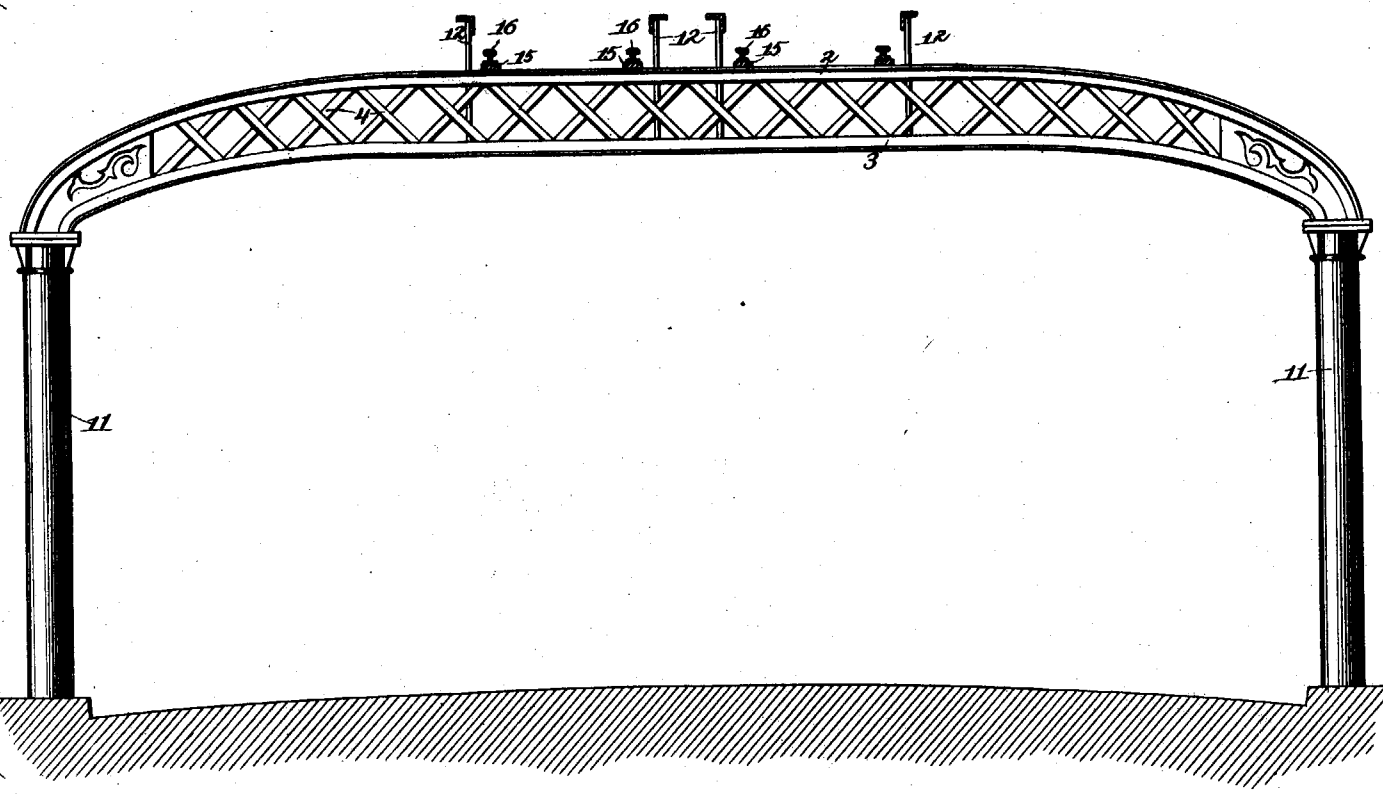

Figure 1 is a longitudinal central sectional view of a portion of a railway constructed in accordance with the terms of my invention, and Fig. 2 is a cross sectional view of the railway.

In the drawings above referred to, 10 represents an arched truss, which extends from two curbstone columns, 11, and serves as the support for longitudinal girders 12. The truss 10 is made up of upper angle-irons, 2, and lower angle-irons, 3, said angle-irons being connected by struts 4; and in forming the truss I prefer that the vertical flanges of the upper angle-irons should extend downward from the horizontal flanges thereof, while the vertical flanges of the lower angle irons extend upward from the horizontal flanges of said irons.

The longitudinal girders 12 may be made in any manner desired in so far as the main bodies of the girders are concerned; but these girders should be formed with main steps 5 and intermediate steps, 6, the intermediate steps being formed by carrying the end irons of the girders inward abruptly, and then continuing said irons downward at an angle to unite with the lower angle-irons of the girders, the main steps resting upon the horizontal flanges of the angle irons 3, while the intermediate steps, 6, rest upon the upper faces of the upper angle-irons, 2, of the trusses 10. From this construction it follows that the upper edges of the horizontal girders will be raised considerably above the upper faces of the arched trusses, and that the weight of the girders and the loads supported thereby will be distributed, about one-half of said load falling upon the upper irons of the arched trusses and about one-half upon the lower irons of said trusses. The girders 12 are provided with horizontal bed-strips 13, said strips being bolted or otherwise connected to the girders, and upon these strips 13 there are placed I-iron cross ties 14, wooden stringers 15, upon which the rails 16 are mounted, being supported by the ties 14. The treads of the rails, as will be seen best, probably, in Fig. 2, are in a plane slightly above that occupied by the vertical center of the longitudinal girders 12, so that said girders serve as guards to prevent any serious mishap in case of the accidental derailment of the cars passing over the road-bed. In order that the girders 12 may be braced laterally the one to the other, I provide cross brace irons 17, that are secured to the girders, and preferably to the under faces of the lower flanges of said girders.

The construction above described embodies all of the advantages set forth in my former patents that have been hereinbefore referred to, and at the same time provides a structure that is much more stable, and one that is better adapted to withstand the wear and tear incident to the continued passage and repassage of the trains.

Having thus fully described my invention, I claim as new and desire to secure by Letters Patent—

1. In an elevated railway structure, the combination, with transverse trusses, of longitudinal girders formed with steps 5 and 6, said steps resting upon the upper and lower angle-irons of the trusses, strips 13, carried by the girders, ties carried by the strips, and stringers and rails carried by the ties, substantially as described.

2. In an elevated railway structure, the combination, with transverse trusses, of longitudinal girders formed with steps 5 and 6, said steps resting upon the upper and lower angle-irons of the trusses, strips 13, carried by the girders, ties carried by the strips, stringers and rails carried by the ties, and transverse tie-bars arranged in connection with the girders, substantially as described.

JAMES M. HANNAHS.

Witnesses:
ALBERT H. ADAMS,
HARRY T. JONES.